United States Patent
Hasfjord

[15] 3,693,682

[45] Sept. 26, 1972

[54] ROTARY CUTTING MACHINE WITH ADJUSTABLE CUTTER

[72] Inventor: Morten Birger Hasfjord, Odeshog, Sweden

[73] Assignee: Svenska Industrietablering Saktiebolaget, Stockholm, Sweden

[22] Filed: Aug. 21, 1970

[21] Appl. No.: 66,037

[30] Foreign Application Priority Data

Aug. 21, 1969 Sweden ............... 11591/69

[52] U.S. Cl. ................. 144/130, 33/DIG. 8, 33/185
[51] Int. Cl. ............................................. B27c 1/00
[58] Field of Search ......... 144/130, 131, 218, 117 R, 114 R, 144/116; 83/344; 90/15.2; 33/DIG. 8, 181, 185

[56] References Cited

UNITED STATES PATENTS

| | | | |
|---|---|---|---|
| 3,171,454 | 3/1965 | Boice | 144/130 X |
| 3,276,306 | 10/1966 | Winkler et al. | 83/344 X |
| 3,206,860 | 9/1965 | Warrick | 144/130 X |
| 1,701,912 | 2/1929 | DeWalt | 144/131 X |
| 2,711,935 | 6/1955 | Miles | 83/344 UX |
| 1,612,998 | 1/1927 | Webb | 144/131 |
| 987,478 | 3/1911 | Mitchell | 144/114 A |

*Primary Examiner*—Andrew R. Juhasz
*Assistant Examiner*—James F. Coan
*Attorney*—Fred C. Philpitt

[57] ABSTRACT

The disclosure relates to an adjustable rotary cutting head for use in jointers, planers, and other similar machines with rotary cutting heads. The rotary cutting head is mounted for rotation in a fixed shaft. The cutting head is adjusted vertically by means of an eccentric portion which raises and lowers the shaft as the eccentric member is rotated. The shaft is adjusted laterally by means of a threaded bore and adjustment screw which moves the shaft axially as the adjustment screw is rotated. Means are provided for indexing the relative rotation of the eccentric member.

7 Claims, 16 Drawing Figures

A ROTARY CUTTING MACHINE WITH ADJUSTABLE CUTTER

The conventional manner of mounting a cutter block is by arranging the solid cutter block between two bearing locations in a frame or head-stock, and securing said block on a shaft. For driving the cutter a pulley is utilized, which is arranged at one of the shaft ends externally of the bearing location. If the cutter block is to be adjustable both axially and radially while the cutter block is rotating, the complete frame must be provided with means for this purpose, for instance guides and screw fittings or the like. The conventional adjustable device with a cutter block, a shaft, a frame with ball bearing housings, guides and screw fittings is quite cumbersome.

U.S. Pat. No. 1,701,912 discloses the support of a rotatable cutter block on a non-rotatable shaft. This shaft is fixedly clamped with its ends between two eccentric devices. This renders impossible the displacement of the shaft transversally to its axial direction when the cutter is rotating.

According to the invention there is provided in a cutting machine, at least one cutter, the cutter body being provided with a pulley and rotatably journalled on a non-rotatable shaft which at one end or both ends is supported in the frame of the machine. The supported end or ends are turnably journalled in the frame eccentrically relative to the rotational axis of said cutter so as to allow, during the rotation of the cutter, a positive adjustment thereof transversally relative to said axis. Thus the distance between said axis and a plane outside the cutting circle of the cutter is changed to the same extent along the whole length of the cutter when an adjustment is made. The invention and its advantages will now be described with reference to the accompanying drawings.

Figures 1, 2:
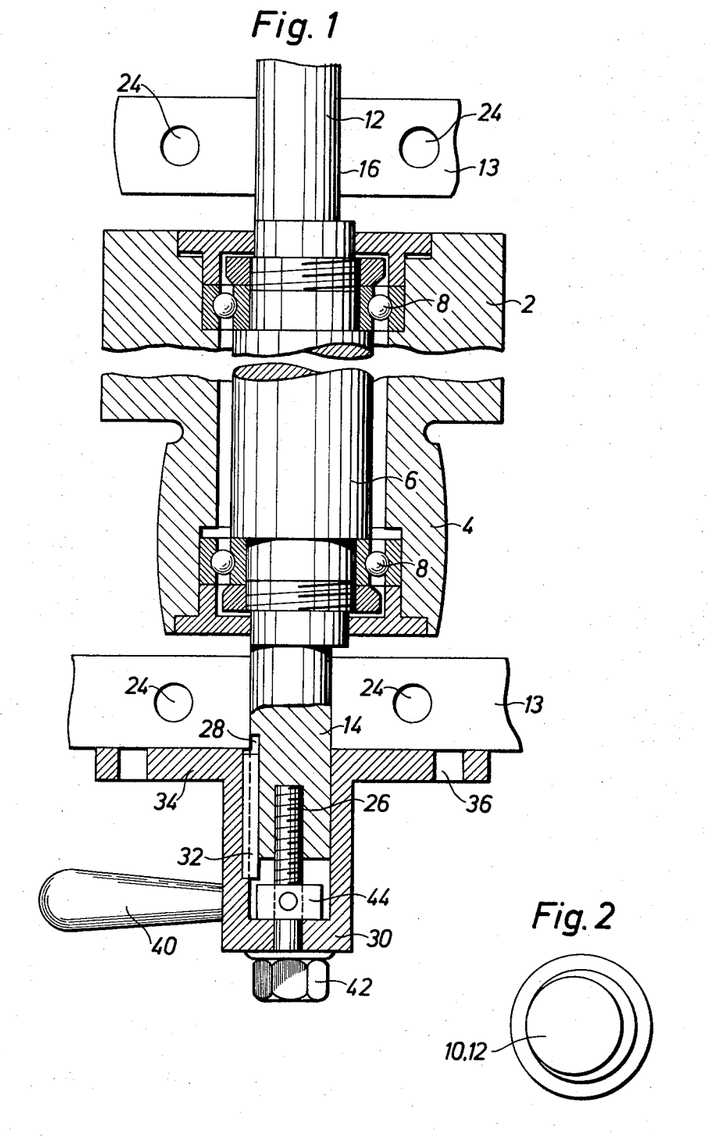
FIG. 1 in axial section shows a first embodiment of a cutter block with regulating means.
FIG. 2 is an end view in the direction of the shaft of the cutter block.

Referring to FIG. 2, cutter block 2 together with an integral pulley 4, is rotatably journalled on a shaft 6 by means of ball bearings 8, which are arranged in a conventional manner, not described. At each end, externally of the cutter block 2,4, the shaft 6 is provided with an eccentric shaft pivots 10 and 12, respectively. The shaft pivots 10 and 12 are rotatably journalled in semicircular recesses in the machine frame 13 at 14 and 16, respectively. They are maintained in position by means of covers 18 (FIG. 3) which are fixed by means of bolts 20 and 22 (FIG. 3), which fit into threaded bores 24 in the frame. The bolts are tightened until a relatively narrow slide fitting is obtained for the shaft pivots 10 and 12. The shaft pivot 10 has a threaded, concentric bore 26 in its end, the function of said bore being described below, and an external axial key-way 28. On the end of the shaft 10 a sleeve 30 is arranged which is non-rotatably secured to the shaft end by means of a key 32 arranged in the key-way 28, said key having a shorter length than the key-way. Thus, the connection between the sleeve 30 and the shaft pivot 10 allows an axial relative displacement. At its end adjacent the frame the sleeve 30 presents a substantially semicircular flange 34, in which a semicircular groove 36 is provided coaxially with the shaft pivot 10. Through this groove extends the shaft of a bolt threaded into the machine frame. The head 38 of said bolt is larger than the width of the groove 36. Further, the sleeve 30 presents a radially protruding handle 40 which is rigidly secured thereto. Through a hole in the closed end of the sleeve 30, a bolt 42 is passed and threaded into the concentric bore 26 mentioned above. The bolt 42 is secured against axial displacement relative to the sleeve 30 and the frame 13 by means of a locking ring 44.

Figure 3:
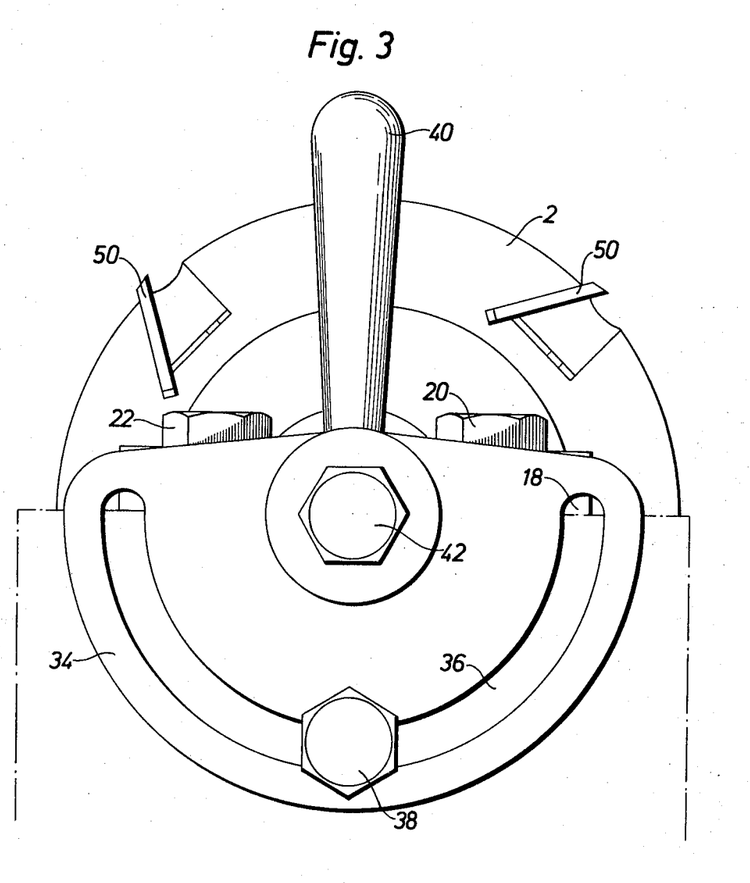
FIG. 3 shows the cutter block with its regulating means as seen from the regulating end.

In FIG. 3 cutting elements 50, which are inserted into the cutter block 2, are shown schematically.

If it is desirable to adjust the cutter block 2,4, radially, the bolt 38 is loosened. The sleeve 30 and the shaft pivot 10 are then turned by means of the handle 40 to the desired position. During this turning the groove 36 is displaced relative to bolt 38. Thereafter, the sleeve 30 is secured by means of the bolt 38 so that the shaft 6, 10, 12 cannot be further turned. In the embodiment shown in FIGS. 1–3, the cutter block 2, 4 is lowered during clockwise rotation and is lifted during counter-clockwise rotation of the handle 40. For axial adjustment of the cutter block 2, 4 the bolt 42 is turned so that the shaft 6, 10, 12 is displaced axially in the desired direction. This axial adjustment is not changed if the height adjustment is changed since the bolt, sleeve and shaft follow each other during the rotation of the sleeve. It is possible to make both of the above-mentioned adjustments while the cutter block is in operation.

For heavier, high-speed cutter blocks, e.g. so-called export planers, it might be desirable to utilize a worm gear with a worm for rotating the shaft 6, 10, 12. Additionally, for short and light cutter blocks it may be sufficient, if the shaft is supported with only one of its ends in the frame and in this case only the supported end needs the eccentric shaft pivot.

Figure 4:
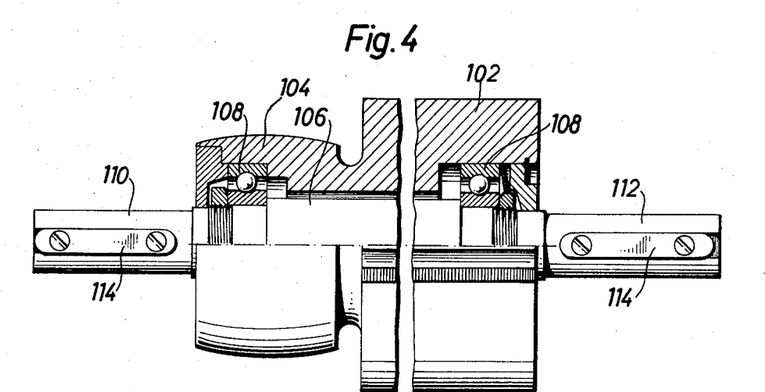
FIG. 4 shows a second embodiment of a cutter, partly axially sectioned.
Figure 5:
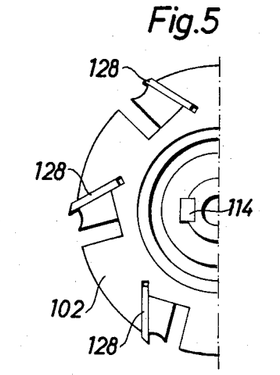
FIG. 5 shows the cutter in FIG. 4 in an end view.
Figure 6:
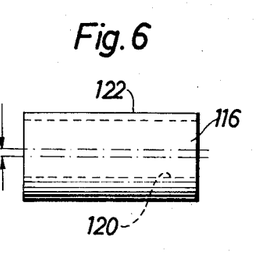
FIG. 6 shows an eccentric sleeve to be used with the cutter in FIGS. 4 and 5.
Figure 7:
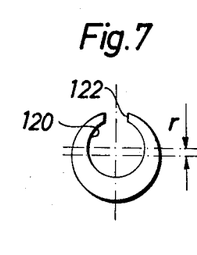
FIG. 7 is an end view of said sleeve.
Figure 8:
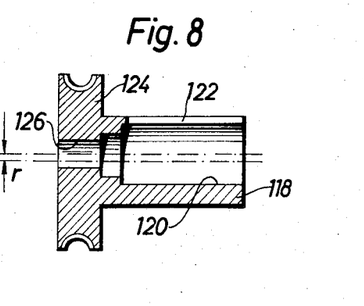
FIG. 8 in a longitudinal section shows an eccentric sleeve provided with a worm gear at one end.
Figure 9:
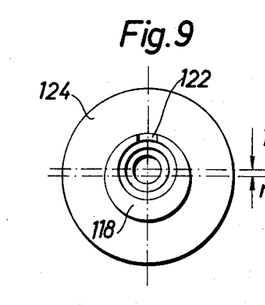
FIG. 9 is an end view of the sleeve in FIG. 8.

FIG. 4 shows the cutter block 102, which is secured to a pulley 104. The body 102, 104 thus combined is rotatably journalled on a shaft 106 by means of ball bearings 108 arranged in a conventional manner not described. The shaft 106 is provided with concentric shaft ends 110, 112, with the same cross section. Each of the shaft ends 110 and 112 is provided in its surface with an axial key-way, in which a key 114 is inserted. The keys 114 of the two shaft ends 110 and 112 are exactly aligned with each other and intended to secure against rotation a sleeve mounted on each of the shaft ends 110 and 112, said sleeve having an axial eccentric bore with an axial slot for the corresponding key. The shape of said sleeves is shown in detail in FIGS. 6–9. The two sleeves, which in FIGS. 6–9 have been given the reference characters 116 and 118, respectively. They define eccentrically arranged axial bore 120, into which the shaft end 110 or 112 fits, and an axial slot 122 for the keys 114. The external dimensions of the sleeves 116 and 118, the bores 120 and the slots 122 are substantially identical in the two sleeves. The two sleeves can be located one either of the shaft ends 110 and 112. This means the same cutter can be used for both directions of rotation as seen from the regulating end, since the cutter can be turned end to end in the supporting device. Thus, the cutter can be used both as a bottom cutter and a top cutter in a planing machine. In both cases it is of importance that the regulating device described below for adjustment of the height of the cutter will be located at the same side in the machine. One of the eccentric sleeves 116 and 118, namely 118, has at one of its ends a worm wheel 124, through which extends a bore 126, which is connected to the eccentric bore 120 and co-axial therewith and with a function, which is described below. FIG. 5 shows schematically a plurality of cutting elements 128 arranged in the periphery of the cutter block 102 and said cutting elements together with the securing means therefore can be of a conventional type.

For the following description it is assumed that the cutter is used as a top cutter in a planing machine. The shaft journals 110 and 112 are provided with eccentric sleeves 116 and 118, respectively. They are rotatably journalled in a bearing bracket with the bearing bracket intended for the sleeve 118 shown in FIGS. 10–12 and referenced 130. The bearing bracket 130 has a parting plane surface 132 forming an angle of between 45° and 90°, preferably between 55°–85°, with a horizontal plane. Surface recesses 134 and 136 with a semicircular cross section are arranged for the sleeve 118 and the worm wheel 124 connected thereto. A bearing cover 138 with a surface and recesses corresponding to the surface 132 and the recesses 134, 136, respectively, is secured by means of bolts 140 and 142 to the surface 132 of the bearing brackets. The recess 134 and the corresponding recess in the cover 138 serves as a bearing for the sleeve 118. The bearing bracket 130 and the cover 138 are matched to each other in such a manner that a relatively narrow slide fit is provided between the shaft end 112 and the bore 120 in the sleeve 118, when the bolts 40 and 42 are tightened up. There is a similar relation between the external mantle surface of the sleeve 118 and its sliding surface in the recess 134 and the corresponding recess in the cover 138. It may be preferable to provide one of the bolts, for instance 140, with an indexing handle, as shown at 144 in FIG. 13 instead of with a conventional bolt head. By means of such a handle the sliding surfaces between the shaft end 112 and the bore 120 in the sleeve and between the sleeve 118 and the bearing bracket 130 and the cover 138, respectively, are matched in such a manner that a stiff sliding fit can be obtained when the indexing handle and the associated bolt 140 are somewhat released. However, this sliding is rendered impossible with the handle 144 in locked position.

Figure 10:
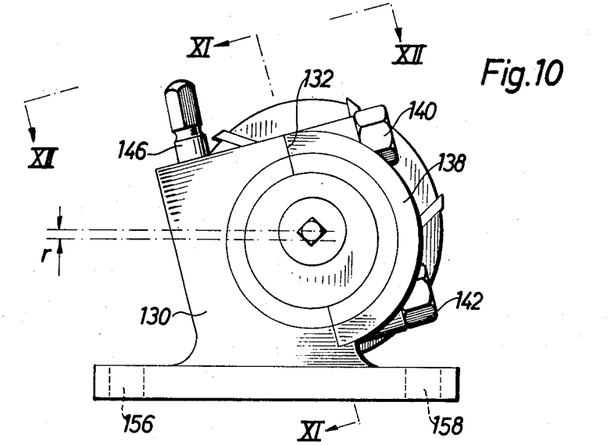
FIG. 10 in an end view shows a gearing bracket for supporting the cutter according to FIG. 4 with the eccentric sleeves.

From the top side of the bearing bracket 130 a worm 146 extends through said bracket and engages the worm wheel 124 in the bearing bracket 130. An adjustment screw 148 extends through the worm wheel 124 co-axially with the shaft end 112, said adjustment screw being threaded at 150 a distance into shaft 112. The adjustment screw 148 is locked against axial displacement relative to the worm wheel 124 by means of retaining rings 152 and 154. In addition, the bearing bracket 130 is provided with threaded bores 156 and 158 adapted to receive bolts screwed into the machine frame, not shown.

The shaft end 110 and mounted sleeve 116 are remote from regulating side of the machine, of the cutter shaft 106, 110, 112, and are provided with a bearing device, comprising a bearing bracket and a cover. It can be similar to the bearing brackets 130 and 138 indicated between the dotted lines A and B in FIGS. 11 and 12. It does not define a bore for the worm and the recess for the worm wheel.

From the point of view of operation it is desirable that the worm 146 has its crank connection directed upwards. At the same time means must be provided to insure that the cutter does not roll out of its position when the bearing bracket covers are removed. As a compromise solution, the parting plane, indicated at 132 is located between the bearing bracket and the cover. The plane is given an inclination towards the underlying horizontal feeding plane. The horizontal feeding plane is the plane along which the wood intended for planing is advanced. At the same time the worm 146 should extend parallel to said parting plane in order to insure that the threads of the worm will release the engagement with the corresponding threads of the worm wheel when the cutter is removed.

Figure 13:
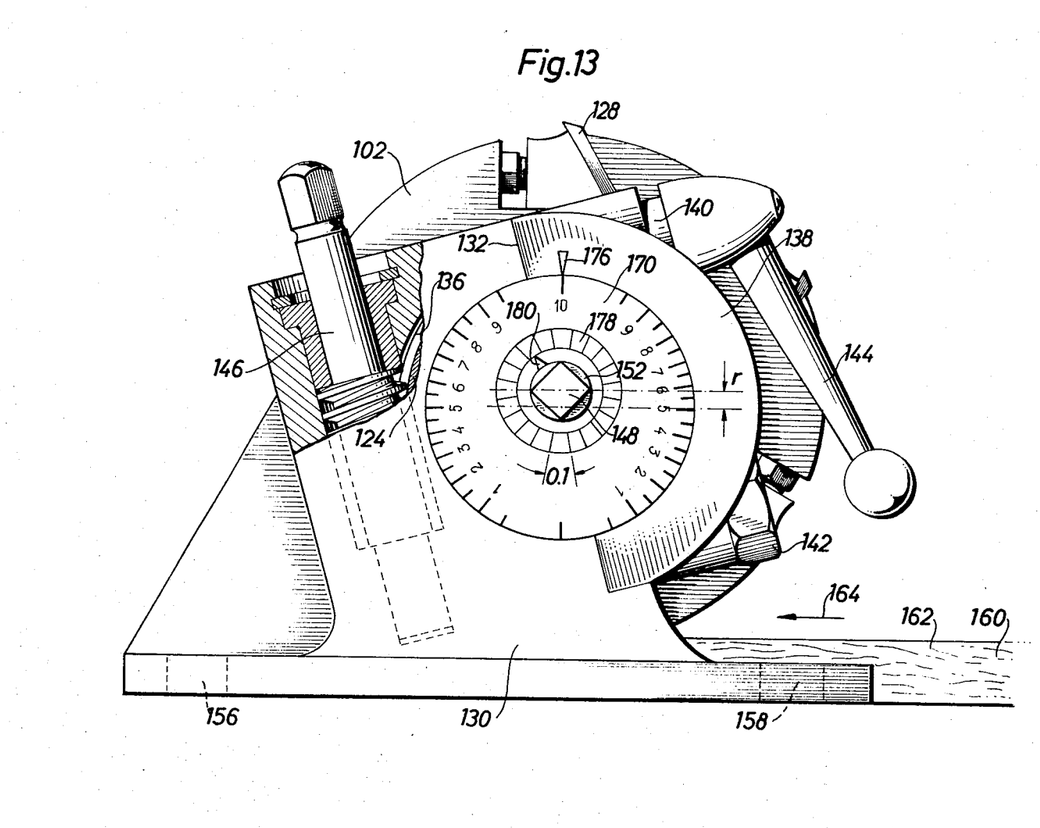
FIG. 13 shows the same view as FIG. 10, but in bigger scale.

FIG. 13 shows a board 160, the top side 162 of which is to be planed. The board is fed in the direction indicated by the arrow 164.

If the planing thickness is to be changed within the range of the eccentricity the bolt 140 is released by means of the handle 144 and the worm 146 is turned so that the cutter will be positioned at the height desired. Thereafter the bolt 140 is locked again.

If the cutting elements 128 are provided with a profile to allow the forming of a corresponding profile on the top side of the board 160, it is also necessary to be able to adjust the axial position of the cutter exactly so that the profile is located at the desired position on the top side of the board. This axial displacement is obtained by rotation of the adjustment screw 148, which by means of its threaded engagement with the bore in the shaft end 112 thereby displaces the cutter axially a desired distance. During this adjustment the bolt 140 is released by means of the handle 144 before the adjustment and after the axial adjustment the same bolt is tightened up. The axial adjustment can be performed without the height adjustment being changed, since the worm and the worm wheel are selflocking. The height adjustment is performed without the axial adjustment being changed, since the worm wheel sleeve 118, the cutter shaft 112 and the adjustment screw 148 follow each other during the rotation due to the key 134.

Figure 14:
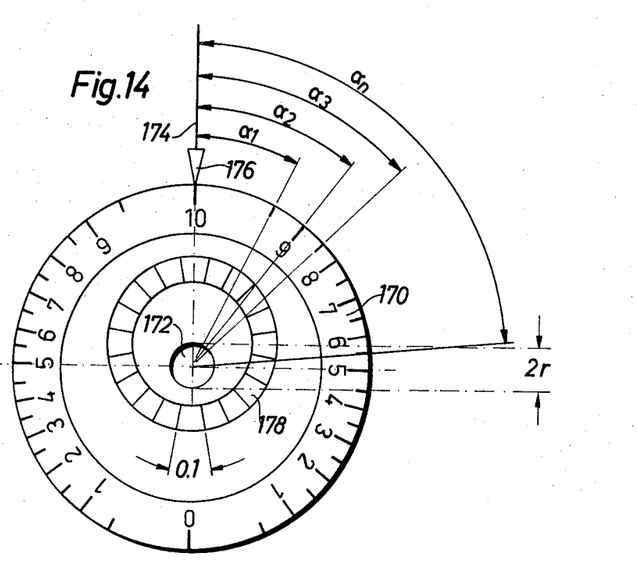
FIG. 14 is a view of a scale used with the gearing bracket of FIG. 13.

The height adjustment of the cutter mentioned above is identical throughout the length of the cutter, since its shaft 106 is eccentrically journalled to exactly the same extent at both ends by means of the sleeves 116 and 118. The range within which the height adjustment can be changed is like 2 $r$, where $r$ is the distance between the bore center of the sleeves 116 and 118 and the circumferential surface of the same sleeves. It is of importance, particularly in top cutter, to know rather exactly to what extent a certain rotation of the worm corresponds to a vertical displacement of the cutter normally relative the feeding direction 164. This information can be obtained by means of the external circular scale in FIGS. 13 and 14. This scale 170 is shown provided with the necessary numerals and is mounted on the side of the worm directed outwards. The scale can be engraved directly on the side of the worm wheel but it is more convenient to manufacture it as a separate disc. The scale 170 can also be engraved on the circumferential surface of the disc 170 as directed at right angle to the plane of the drawing. When the worm wheel 124 is rotated one revolution, the center of rotation of the cutter block 102, 104 is displaced along the circle referenced 172 in FIG. 14 having the radius $r$. The total range of regulation in a vertical direction will consequently be 2 $r$, as mentioned above. The number of scale lines on the scale disc 170 is preferably an integer multiple of $r$. The angles $60_n$ in FIG. 14 which form the radial scale lines of the scale 170 are to indicate with the vertical line 174 the maximum and minimum height of the cutter relative to the working plane. It is assumed that the number of scale lines desired on the scale disc at both sides of the line 174 is $k$ and that the length of each unit of displacement in a vertical direction, corresponding to displacement between two scale lines, is $a$. Thus $a°k = 2 r$. Since each vertical unit of displacement corresponds to two scale lines located on either side of the line 174 of the scale disc, the angle $60_n$ is between $0°$ and $180°$. For $\alpha_n$ between 0 and $90°$ the following expression can be developed by simple trigonometrical solutions:

$$\cos \alpha_n = \frac{r - n°a}{r} = \frac{r - n°2r/k}{r} = 1 - \frac{2n}{k}$$

For $60_n$ between $90°$ and $180°$ the following expression can be deducted in a similar way $$\cos(180 - 60_n) = -(1 - 2n/k) = -\cos\alpha_n$$

Consequently, for angles $\alpha_n$ between $0°$ and $180°$ the following expression is obtained $$\cos\alpha_n = 1 - 2n/k$$

Figure 11:
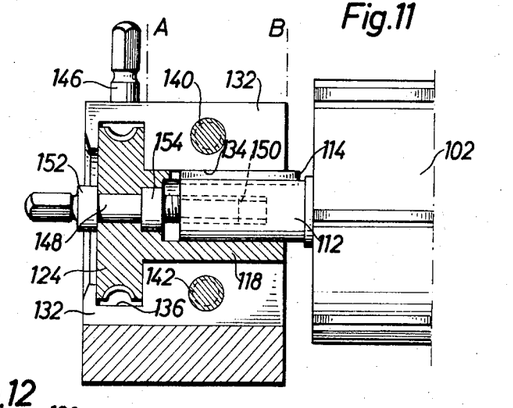
FIG. 11 is a section in the direction of arrows XI—XI in FIG. 10.
Figure 12:
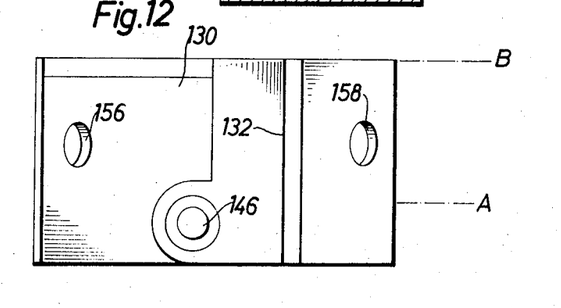
FIG. 12 is a view in the direction of arrow XII in FIG. 10, whereby the cover belonging to the gearing bracket has been omitted.

The scale in FIGS. 10 and 11 is drawn with $r = 5$ mm and $a = ½$ mm. Consequently, $k = 20$.

The end points of the scale lines on the periphery of the scale disc can also be obtained by drawing a number of parallel, equally spaced arcs of the circle defining the scale disc equal to the desired number of vertical units of displacement. Three such arcs relative to line 174 have been drawn in FIG. 14.

The height adjustment of the scale disc 170 is read opposite a fixed mark 176 on the bearing bracket 130.

The scale disc shown in FIGS. 13 and 14 also presents an inner linear scale 178. This scale is intended for the reading of the axial displacement of the cutter on turning of the adjustment screw 148. The interval between two scale lines can, for instance, correspond to an axial displacement of 0.1 mm. If the adjustment screw 148 has a pitch of 2 mm the scale is divided into 20 equal parts. The amount of the axial displacement is indicated by the number of scale lines on the scale 178, passed by the indicator 180. The indicator is mounted on the locking ring 152 which in turn is mounted on the adjustment screw 148.

Figure 15:
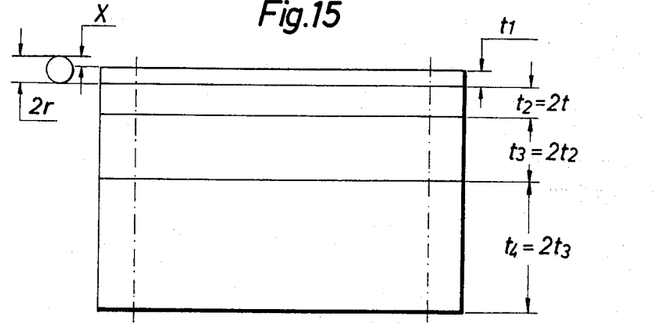
FIG. 15 in end view shows washers for a gearing bracket.
Figure 16:
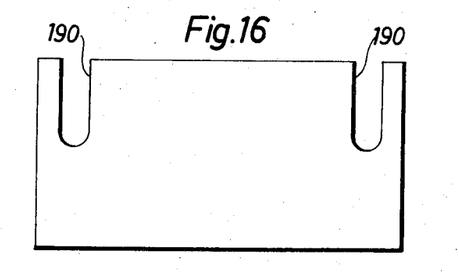
FIG. 16 in side view shows washers for a gearing bracket.

In conventional multicutter planing machines it is desirable to be able to plane any thickness up to about 100 mm. It is obvious that this is not possible with the eccentric devices described above without said devices becoming too cumbersome. The thickness of the wood is determined by the position of the top cutter over the feeding plane. In order to solve this problem washers can be used as shims for the bearing brackets as shown in FIGS. 15 and 16. These shims define recesses for the securing bolts extending through the bores 156 and 158 in the bearing bracket. These washers are given various thickness, as shown in FIG. 15. If the total change of height obtainable by means of the eccentric means is 2 $r$, as mentioned above, the bearing bracket is dimensioned so that without a washer it is possible to attain the smallest planing thickness $T_{min}$ for which the machine is intended. Consequently, without washers it is possible to plane all dimensions between $T_{min}$ and $T_{min} + 2 r$. Therefore, the first set of washers must not be thicker than to allow safely attaining $T_{min} + 2 r$, when the cutter is in its bottom position. Therefore, it is desirable that a first set of washers is given a thickness $t_1 + r - x$, where $x$ represents a relatively small dimension in this connection, e.g., $0 \leq x \leq 3$ mm. The range of $x$ depends on the extent to which it is desirable to grind the cutting edges of the cutting elements on the surface without the need of the cutting elements being removed and displaced outwards from the cutter center. The thickness of the next set of washers is made $t_2 = 2 t_1$. By means of these two sets of washers, separately or in pairs, it is thus possible to plane all thickness up to $T_{min} + 2 r + 3 t_1$. The next thickness of the washers therefore should be $t_3 = 4 t_1 = 2 t_2$. The thickness of the $n^{th}$ set will thus be $t_n = 2 t_{n-1}$.

The method with washers at first sight may appear unnecessarily complicated but in a closer analysis it is found that the method provides substantial advantages. The costly guide frames, which in conventional planing machines are mounted on the top side of the table, are eliminated. In addition, the corresponding guide arrangements and the frame, in which the top cutter with the rotatable shaft is mounted, are eliminated. The disadvantages, caused by dust and shaving entering the slots of these guides, are eliminated. The entrance of shavings and dust often causes the need of demounting said machine elements for cleaning and lubricating. In planers of the type in question, export planers, it is sufficient if $T_{min}$ is assumed = 7 mm. If thereafter $r$ is selected as 5 mm and $x = 1$ mm, $t_1 = 9$ mm is obtained, as mentioned above. By means of the set of washers having the thickness $t_1$ it is then possible to plane all wood with a finished thickness of between 16 mm and 26 mm according to the above.

Within this range of thickness the planers as a rule are operated at least 90 percent of their time in operation and, consequently, washers need seldom be exchanged. Further it is usual that on removal of the cutter or the cutter block for regrinding the cutting elements are removed when changing from one dimension to another. This is easily performed if a change regarding the washers is required, as may be the case when the cutter is removed. In conventional planers, the operator may release the wedges regulating the guide play so as to facilitate the adjustment while adjusting the position of the top cutter over the feeding plane. Dust and shaving which have entered into the slots then cause the regulating devices to grip. This may in turn cause the cutter in operation to incline downwards towards one end and thereby cause defects in the planed wood. Even such defects are eliminated by means of the system with spacers.

The invention is not limited to the embodiments described above and illustrated on the drawings but can be modified within the scope of the accompanying claims. As mentioned above, the invention is suitable in cutters of all kinds, including bottom cutters and vertically mounted cutters as well as in rotatable cutting tools in general.

The advantages obtained by having the bearings built into the cutter block and rotating on a nonrotatably shaft are evident. Contrary to the case in conventional cutter block structures the cutter block according to the present invention fulfils a plurality of functions. It is partly a cutter block, partly a pulley and partly a bearing housing. This results in a rotatable unit with good balance. All regulating means are simple and easily attainable. Another evident advantage occurs in grinding when straight cutting edges are used. Since the cutter block is easy to demount, the cutting edges need not be loosened in all regrindings but can be ground in place in the cutter block. If the cutter block has between the cutting edges a real center of rotation, this center also becomes the center for the grinding operation. This results in that the risk of cutter beatings in the material treated is reduced to a minimum, since all cutting edges have substantially exactly like cutting circles. This is of great importance in wood converting machines which operate with high feeding speeds.

In the first hand the cutter tool described above and shown on the drawings is intended for wood cutting machines. However, the invention is not limited to the embodiment described but can be varied within the scope of the following claims.

I claim:

1. A rotary cutting machine having at least one cutter comprising,
   a. a frame for supporting a cutting mechanism, said cutting mechanism being rotatably mounted on a non-rotatable shaft, said non-rotatable shaft mounted on said frame, said shaft having means for positively adjusting said shaft transversely of the axis of said shaft during the rotation of said cutting mechanism,
   b. said non-rotatable shaft having at least one end defining a threaded bore extending in the longitudinal direction of said shaft, and
   c. an adjustable screw mounted on said frame for engaging said threaded bore and shifting said non-rotatable shaft in an axial direction.

2. A cutting machine as claimed in claim 1 wherein a circular scale is provided about the axis of said adjustment screw, the number of scale lines being an integer multiple of the pitch of said screw.

3. A rotary cutting machine as claimed in claim 1 wherein
   a. said means for positively adjusting said shaft comprises an eccentric sleeve mounted around at least one end of said non-rotating shaft, said eccentric sleeve being rotatably journaled in said frame,
   b. worm gear means for rotating said eccentric sleeve whereby the distance between the rotational axis of a cutter mounted on said shaft in a horizontal plane outside the cutting circle of the cutter is changed to the same extent along the entire length of the cutter as said worm gear means is rotated,
   c. a fixed circular scale for determining the shift of said cutter at a right angle from a plane parallel to said rotational axis when said eccentric sleeve is rotated, the scale lines of said scale being distributed according to a cosine function.

4. A cutting means as claimed in claim 3 wherein the bracket means for securing said eccentric sleeve to said frame defines a parting plane between said frame and said bracket, the angle between said parting plane and said horizontal plane being larger than 45° and less than 90°, said worm portion of said worm gear means extending parallel to said parting plane.

5. A rotary cutting machine having at least one cutter comprising:
   a. a frame for supporting a cutting mechanism, said cutting mechanism being rotatably mounted on a non-rotatable shaft, said non-rotatable shaft being mounted on said frame, said shaft having eccentric means for positively adjusting said shaft transversely of the axis of said shaft during the rotation of said cutting mechanism,
   b. said eccentric means defining an eccentric sleeve mounted around at least one end of said non-rotatable shaft, said eccentric sleeve being rotatably journaled in said frame,
   c. worm gear means for rotating said eccentric sleeve whereby the distance between the rotational axis of the cutter mounted on said shaft and a horizontal plane outside the cutting circle of the cutter is changed to the same extent along the entire length of the cutter as said worm gear means is rotated,
   d. means for securing said eccentric sleeve to said frame whereby a parting plane is defined between said frame and said securing means, the angle between said parting plane and said horizontal plane being larger than 45° and less than 90°, said worm portion of said worm gear means extending parallel to said parting plane.

6. A rotary cutting machine having at least one cutter comprising
   a. a frame for supporting a cutting mechanism said cutting mechanism being rotatably mounted on a non-rotatable shaft, said non-rotatable shaft mounted on said frame, said shaft having eccentric means for positively adjusting said shaft transversely to the axis of said shaft during the rotation of the cutting mechanism,
b. said eccentric means defining an eccentric sleeve mounted around at least one end of said non-rotatable shaft, said eccentric sleeve being rotatably journaled is said frame,
c. bracket means for securing said eccentric means to said frame and being detachably mounted thereon,
d. shim means mounted between said bracket and said frame wherein each set of shims has a thickness of $t_n=2t_{n-1}$, whereby $t_1=2r-x$, and $r$ is the radius in the circle described by the rotational axis of the cutting mechanism when said eccentric sleeve is rotated one complete revolution.

7. A rotary cutting machine comprising at least one cutter, said cutter being provided with a pulley and rotatably journaled on a non-rotatable shaft, a frame means for supporting at least one end of said shaft, said shaft being rotatably and eccentricly journaled in said frame so as to allow, during the rotation of said cutter, a positive adjustment thereof transversely to said rotational axis so that the distance between said axis and a plane outside the cutting circle of the cutter is changed to the same extent along the entire length of the cutter, and lateral adjustment means mounted on said frame for axially adjusting the non-rotatable shaft along the axis of rotation.

* * * * *